United States Patent
Payton (10) Patent No.: US 6,754,383 B1
(45) Date of Patent: Jun. 22, 2004

(54) LOSSY JPEG COMPRESSION/RECONSTRUCTION USING PRINCIPAL COMPONENTS TRANSFORMATION

(75) Inventor: Paul Max Payton, Burlingame, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 570 days.

(21) Appl. No.: 09/625,859

(22) Filed: Jul. 26, 2000

(51) Int. Cl.[7] .............................. G06K 9/00; G06K 9/36; G06K 9/46; G03F 3/08
(52) U.S. Cl. ..................... 382/166; 382/251; 382/248; 382/233; 358/523
(58) Field of Search ................................ 382/162, 166, 382/232, 233, 239, 238, 244, 248, 250, 251, 252; 358/523, 525, 530

(56) References Cited

U.S. PATENT DOCUMENTS

| | | | | |
|---|---|---|---|---|
| 5,014,198 A | | 5/1991 | Umemura | 364/413.13 |
| 5,196,946 A | | 3/1993 | Balkanski et al. | 358/433 |
| 5,422,736 A | * | 6/1995 | Katayama | 358/462 |
| 5,465,164 A | * | 11/1995 | Sugiura et al. | 382/252 |
| 5,680,129 A | | 10/1997 | Weinberger et al. | 341/65 |
| 5,982,432 A | * | 11/1999 | Uenoyama et al. | 375/240.01 |
| 6,049,775 A | | 4/2000 | Gertner et al. | 705/8 |
| 6,125,201 A | * | 9/2000 | Zador | 382/166 |
| 6,195,466 B1 | | 2/2001 | Schwartz et al. | 382/250 |
| 6,236,749 B1 | | 5/2001 | Satonaka et al. | 382/154 |
| 6,266,440 B1 | * | 7/2001 | Oneda | 382/166 |
| 6,308,193 B1 | | 10/2001 | Jang et al. | 708/401 |
| 6,404,928 B1 | * | 6/2002 | Shaw et al. | 382/232 |
| 6,427,029 B1 | * | 7/2002 | Kono et al. | 382/248 |
| 6,453,072 B1 | * | 9/2002 | Hatakenaka | 382/232 |
| 6,453,073 B2 | * | 9/2002 | Johnson | 382/239 |

* cited by examiner

*Primary Examiner*—Andrew W. Johns
*Assistant Examiner*—Amir Alavi
(74) *Attorney, Agent, or Firm*—McDermott, Will & Emery (57) ABSTRACT

The present invention is a system, method, and computer program product for compression and reconstruction of a color image using principal components transformation. The method is performed on a computer or other programmable data processing apparatus. The method is performed in combination with the standard JPEG image compression technique. According to the invention, the method receives color image information. The received color image information is converted into intrinsic color information. The intrinsic color information is based on the color image's intrinsic and unique color distribution.

42 Claims, 9 Drawing Sheets

$$\begin{vmatrix} r'*r' & r'*g' & r'*b' \\ g'*r' & g'*g' & g'*b' \\ b'*r' & b'*g' & b'*b' \end{vmatrix}$$

LOSSY JPEG COMPRESSION/RECONSTRUCTION USING PRINCIPAL COMPONENTS TRANSFORMATION

FIELD OF INVENTION

The present invention relates to true color image compression and reconstruction. More particularly, the present invention relates to lossy compression and reconstruction using an image specific color transformation.

BACKGROUND OF THE INVENTION

JPEG (pronounced "jay-peg") is a standardized image compression mechanism. JPEG stands for Joint Photographic Experts Group, the original name of the committee that wrote the standard. JPEG is designed for compressing either full-color or gray-scale images of natural, real-world scenes. It works well on photographs, naturalistic artwork, and similar material; not so well on lettering, simple cartoons, or line drawings. JPEG handles only still images. JPEG is "lossy," meaning that the decompressed image isn't quite the same as the one you started with. JPEG achieves much greater compression than is possible with lossless methods. JPEG is designed to be lossy, and thus exploits the known limitations of the human eye. More specifically, the fact that small color changes are perceived less accurately than small changes in brightness. Thus, JPEG is intended for compressing images that will be looked at by humans. In contrast, the small errors introduced by JPEG may be a problem for images intended to be machine-analyzed.

A useful property of JPEG is that adjusting compression parameters can vary the degree of lossiness. This means that the image-maker can trade off file size against output image quality. You can make extremely small files if you don't mind poor quality, such as indexing image archives. Conversely, if you aren't happy with the output quality at the default compression setting, you can increase the quality until you are satisfied, and accept lesser compression.

The JPEG compression algorithm may be implemented in both software and hardware. For example, C-Cubed Microsystems introduced the first JPEG chip for compressing digital video images. Hardware provides the requisite speed for real-time compression. JPEG++, an algorithm described in U.S. Pat. No. 5,014,198, developed by Storm Technology, is an extension to JPEG.++ JPEG allows selected picture areas to be compressed at different ratios depending on the significance of the visual impact to the area in the image.

A problem with the traditional JPEG algorithm, and each of the aforementioned techniques, is that they all employ a fixed color space transformation. Generally, a fixed color space transformation is employed to transform an image from RGB into a luminance/chrominance color space (i.e., "YUV"), where luminance is the first component and chrominance the second and third components. To perform the transform a fixed predetermined matrix is employed that transforms the image from a RGB color space into a luminance/chrominance color space represented in an unsigned byte form (i.e., "YCrCb"). The rationale for using a luminance/chrominance color space is that some chrominance information can be lost in an image since the human eye is less likely to perceive the changes in the chrominance or color component of a reconstructed image. As a result, the chrominance components are subsampled or reduced, while the luminance component is left at full resolution.

Unfortunately, the use of a predetermined matrix to execute the transformation does not assure that the most information is presented in the first component because it does not consider the wide variety of possible scene content. More specifically, the transformation does not actively control or attempt to provide the most information about an individual image in the first component. Consequently, all images are treated equally despite the errors that may occur when reconstructing a compressed image, and thus affect image perception. Accordingly, images or applications that have a lower tolerance for loss are compressed at lower ratios since more information in the second and third components is required. This results in larger files, and thus less file storage space. In addition, larger files require significantly more time to transmit from a host to a remote site than smaller files. As a result, a method is needed that provides optimal image compression to improve file storage capacity and transmission time, while reducing image quality degradation.

SUMMARY OF THE INVENTION

Based on the above and foregoing, it can be appreciated that there presently exists a need in the art for a computer system and corresponding operating method which overcomes the above-described deficiencies. The present invention was motivated by a desire to overcome the drawbacks and shortcomings of the presently available technology, and thereby fulfill this need in the art.

It is therefore a feature and advantage of the present invention to provide an image compression and reconstruction technique that improves the image quality of a reconstructed image.

It is another feature and advantage of the present invention to reduce image quality degradation at high compression ratios.

It is another feature and advantage of the invention to optimize utilization of file space.

It is a further feature and advantage of the invention to compress a color image utilizing a transformation that is different for each image.

It is another feature and advantage of the invention to generate a transformation based on the color image's color distribution.

It is a further feature and advantage of the invention to reduce transmission time in sending compressed images.

Further features and advantages of the invention will become apparent to those skilled in the art with reference to the accompanying figures and written description below.

The present invention is a system, method, and computer program product for compression and reconstruction of a color image using principal components transformation. The method is performed on a computer or other programmable data processing apparatus. The method is performed in combination with the standard JPEG image compression technique. According to the invention, the method receives color image information. The received color image information is converted into intrinsic color information. The intrinsic color information is based on the color image's intrinsic and unique color distribution. This intrinsic color information characterizes the color image in a manner that increases the image quality of a reconstructed image, reduces the size of a compressed file as well as image transmission time.

BRIEF DESCRIPTION OF THE DRAWINGS

The details of the present invention, both as to its structure and operation can best be understood by referring to the following description with reference to the accompanying drawings in which:

FIG. 2 consists of FIGS. 2A–2B, which depict block diagrams of the routines that implement the method of the present invention.

DETAILED DESCRIPTION OF THE INVENTION

The present invention is now described more fully hereinafter with reference to the accompanying drawings that show preferred embodiments of the invention. This invention, however, may be embodied in many different forms and should not be construed as limited to the embodiments set forth herein. Appropriately, these embodiments are provided so that this disclosure will be thorough and complete, and will fully convey the scope of the invention. As will be appreciated by one having skill in the art, the present invention may be embodied as a method, data processing system, or computer program product. Accordingly, the present invention combines software and hardware to produce the embodiments described in further detail below. Furthermore, the present invention may take the form of a computer program product on a computer-readable storage medium having computer-readable program code means embodied in the medium. Any suitable computer-readable medium may be utilized including hard disks, CD-ROMs, floppy disks, optical storage devices, magnetic storage devices, etc.

The present invention is described below with reference to flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a general-purpose computer, special purpose computer, or other programmable data processing apparatus to produce a machine. These computer program instructions, which execute on the computer or other programmable data processing apparatus, create means for implementing the functions specified in the flowchart block or blocks. These computer program instructions may be stored in a computer-readable memory to direct a computer or other programmable data processing apparatus to function in a particular manner, producing an article of manufacture including instruction means which implement the function specified in the flowchart block or blocks. The computer program instructions may also be loaded onto a computer or other programmable data processing apparatus to cause a series of operational steps to be performed, producing a computer implemented process, such that the computer or other programmable apparatus provide steps for implementing the functions specified in the flowchart block or blocks. In one implementation, these computer program instructions are written in the C programming language. It is to be appreciated, however, that these routines may be implemented in any of a wide variety of programming languages.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 1:
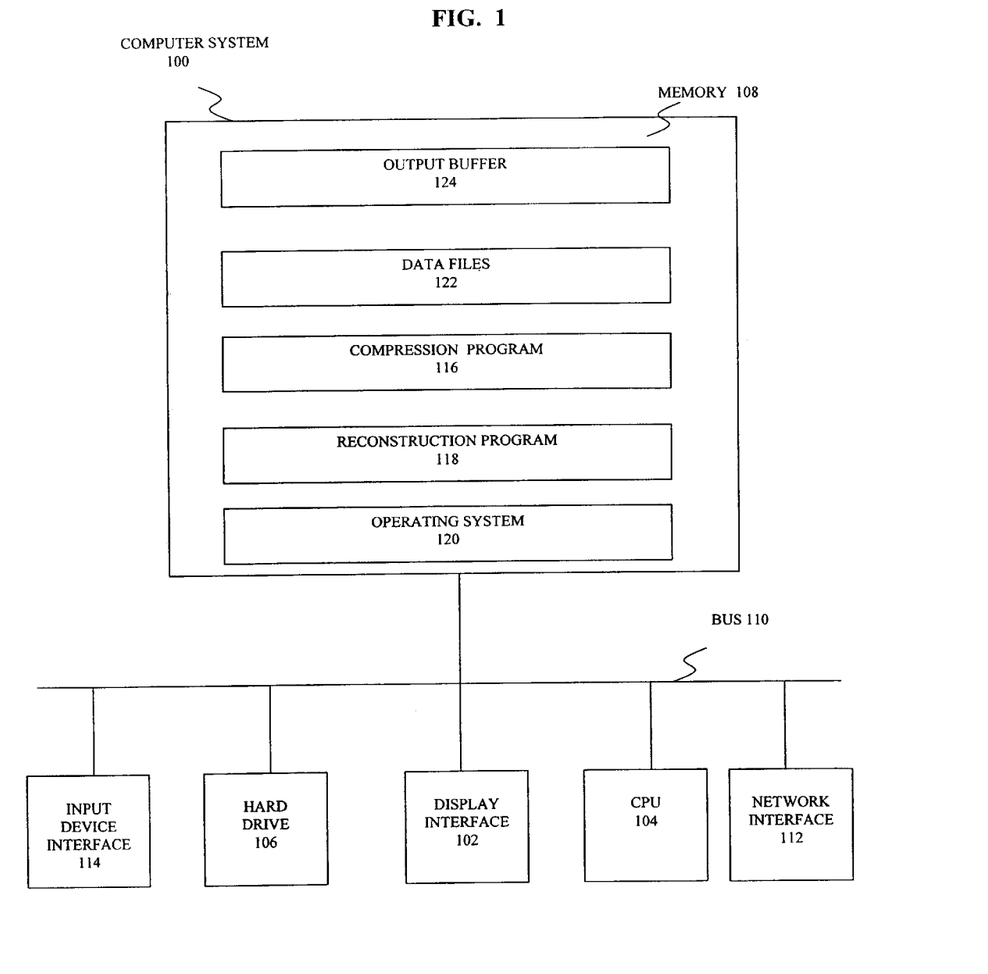
FIG. 1 is a functional block diagram of a computer in which the invention of the present invention can be carried out.

Referring now to FIG. 1, a block diagram of a computer system is illustrated for implementing the methods and computer program product in accordance with the preferred embodiment of the present invention. Computer system 100 includes a display interface 102 for visually displaying information to a computer user, a central processing unit (CPU) 104, hard drive 106, main memory 108, network interface 112, input device interface 114, and output buffer 124. As shown, the various components of the system 100 communicate through a system bus 110 or similar architecture. Typically, CPU 104 is a microprocessor, such as an INTEL PENTIUM® processor, but may also be any processor that executes program instructions in order to carry out the functions of the present invention. Input device interface 114 provides the capability to input data to computer system 100. For example, input device interface 114 may include a keyboard (not shown) or a mouse (not shown). Network interface 112 provides for data to be transmitted and received over a network.

Systems Memory 108 stores data, such as compression routine 116, reconstruction routine 118, operating system 120, and a plurality of data files 122. Compression processing routine 116 and reconstruction processing routine 118 are computer program instructions executed by CPU 104 that may be loaded into systems memory 108. The routines 116 and 118 implement the functions, as described in detail hereinafter, performed by the present invention. In addition, processing routines 116 and 118 may also be stored on computer readable media and used therefrom by computer system 100 to perform the specified functions or steps in accordance with the present invention. Operating system 120 provides overall system functionality. The output buffer 124, in FIG. 1, stores uncompressed image data for display on display 102. While the preferred embodiment is implemented on a computer system, one having ordinary skill in the art will recognize that the methods and computer program product in accordance with the present invention can be implemented on any system provided with a central processing unit, input/output circuitry, and a memory, such as a digital camera and the like.

Figure 2A:
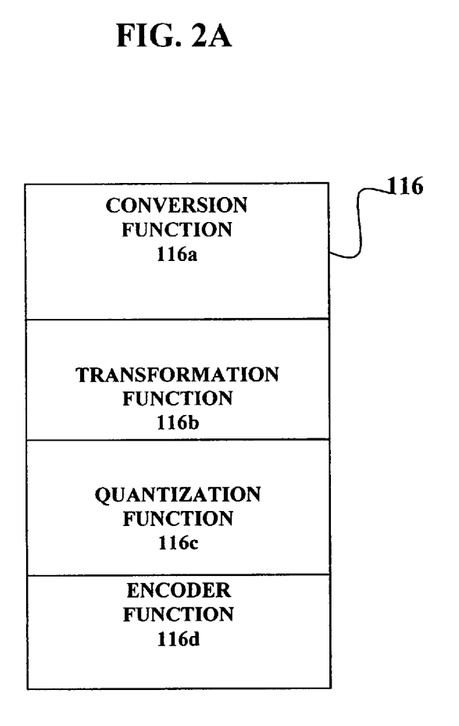
Figure 2B:
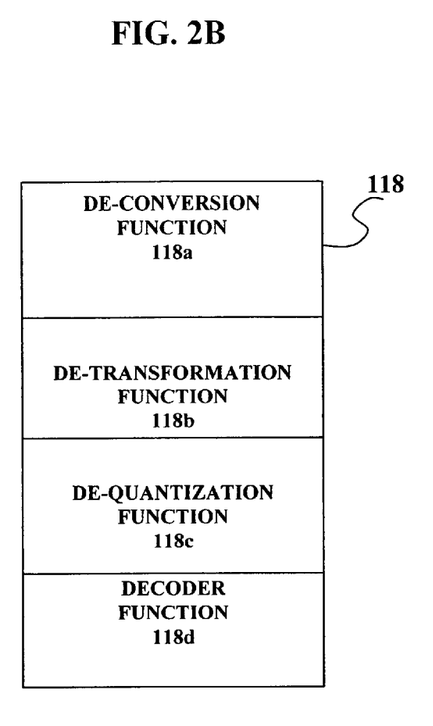

In FIG. 2A, a more detailed view of the functions implementing the compression routine 116 is depicted. The compression routine includes a conversion function 116a, a transformation function 116b, a quantizer function 116c, and an encoder function 116d. In FIG. 2B, the functions implementing the reconstruction routine 118 are shown. Reconstruction routine includes a de-conversion function 118a, a de-transformation function 118b, a de-quantizer function 118c, and a decoder function 118d. As will be described in detail below the present invention enables the computer system, under the direction of routines 116a–116d and 118a–18d to compress and reconstruct color images with less loss of image quality.

Figure 3:
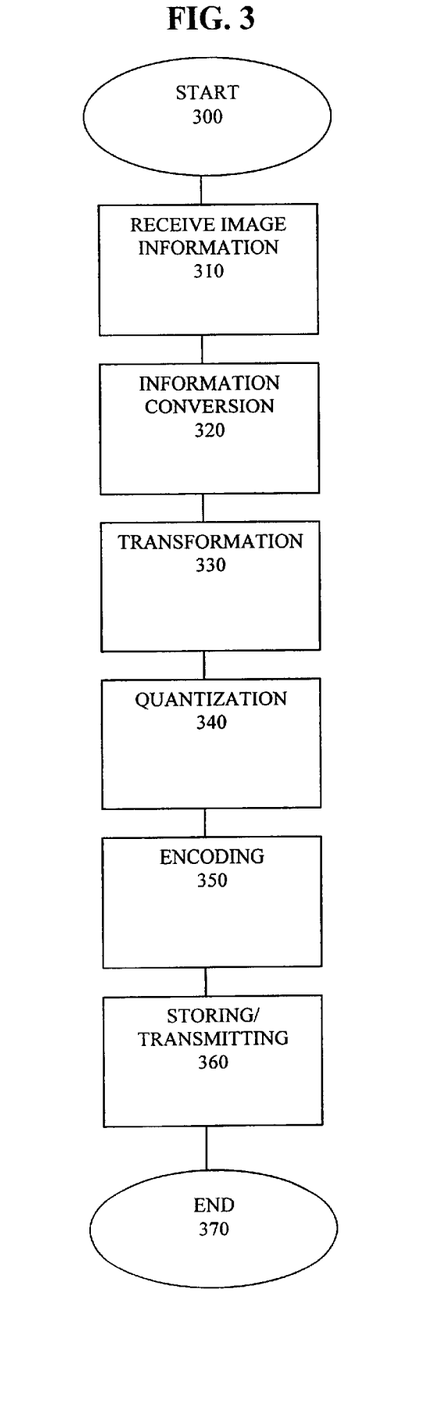
FIG. 3 is a flow diagram of the method performed in the computer of FIG. 1, in accordance with the present invention.

In FIG. 3, the process for compressing a color image is depicted as a block diagram. In Step 300, the compression process begins. In Step 310, the process receives input image information corresponding to a color image obtained and designated for compression. The obtained color image can be one of a scanned raster image, a photograph from a digital camera, or a satellite image, such as Space Imaging's IKONOS™, CNES/France's SPOT and the United State's Landsat. The image can be obtained and designated in many forms, such as a user initiated download. The input image information includes a plurality of numerical value sets representing the obtained color image in one of a plurality of normal color space signal formats. A normal color space signal format is a set of three numerical values which characterizes an image's colors in a particular color system using spectral weighting functions.

In the preferred embodiment, the obtained color image is represented in the normal color space signal format RGB. In an alternative embodiment, the color image can be represented in the CMYK normal color space signal format. Each set of three numerical values of the plurality of numerical value sets is associated with a pixel in the array of pixels associated with the obtained color image. The set of values in the normal color space signal format of the preferred embodiment is provided as a color triple, such as (0,0,0). Each numerical value in the set corresponds to a color component used by the color system. The color components are used in combination by the particular color system to represent colors. Variation of the numerical values in a set varies the represented color of the associated pixel. For example, the set of three numerical values or color triple $0_R, 0_G, 0_B$ represents the color black, where the numerical values correspond respectively to the red, green, and blue components for generating the color black in the RGB color system. The plurality of numerical value sets enables the display of images for viewing on display 102, as well as the compression and reconstruction of an image.

In Step 320, the received input image information is converted into intrinsic color information in response to the CPU 104 executing the conversion function 116a. The Karhunen-Loeve transformation generates the intrinsic color information. Intrinsic color information is image pixel information provided in a manner that the most information about an image is presented in the first component. The intrinsic color information includes a plurality of value sets for the designated image. The plurality of value sets represents the designated image in a principal components space signal format. The principal components space signal format is based on, and defined by the color image's intrinsic color distribution. The details for converting the received color image information into intrinsic color information Step 320 using the Karhunen-Loeve transformation will be described more fully below with reference to FIG. 4.

In Step 330, the CPU 104, under the instruction of the transformation function 116b, performs an approximation of the values in the plurality of intrinsic value sets, described more fully below, in response to receiving the intrinsic color information generated in Step 310. The transformation function 116b applies trigonometric functions to the intrinsic color information, in accordance with the JPEG discrete cosine transform ("DCT") compression standard, to generate a plurality of approximation values. The DCT is a relative of the Fourier transform and likewise gives a frequency map. The motivation for doing this is that you can now throw away high-frequency information without affecting low-frequency information. The DCT transform itself is reversible except for roundoff error. The techniques and methods for implementing the JPEG discrete cosine transform are well known in the art.

In Step 340, the CPU 104, under the instruction of quantizer function 116c, performs the quantization process in response to receiving the plurality of approximation values in Step 330. The quantization process reduces or truncates the plurality of approximation values to a predetermined range of integer values, and thus, reduces the number of bits that are required to represent the approximation values. Quantization is performed by dividing each approximation value by a predetermined value. Generally, the predetermined value is obtained from an entry in a quantization table. It will be readily apparent to one having ordinary skill in the art that the entries in the quantization table may vary to optimize operation with a particular type of image data.

In Step 350, the CPU 104, under the instruction of encoding function 116d, performs the encoding process in response to receiving the plurality of quantized approximation values in Step 340. The encoding process reduces the number of bits that are used to represent the quantized approximation values. The reduction can be accomplished using Huffman coding. The coding replaces subsets of bit information corresponding to quantized approximation values with bit information that more efficiently represents the subsets of bit information. The encoding process generates a reduced stream of bits which compactly represents the quantized approximation values in a non-redundant manner. The reduced bit stream generated by the encoding process corresponds to a compressed representation of the color image. The techniques and methods for encoding information are well known in the art.

Figure 9:
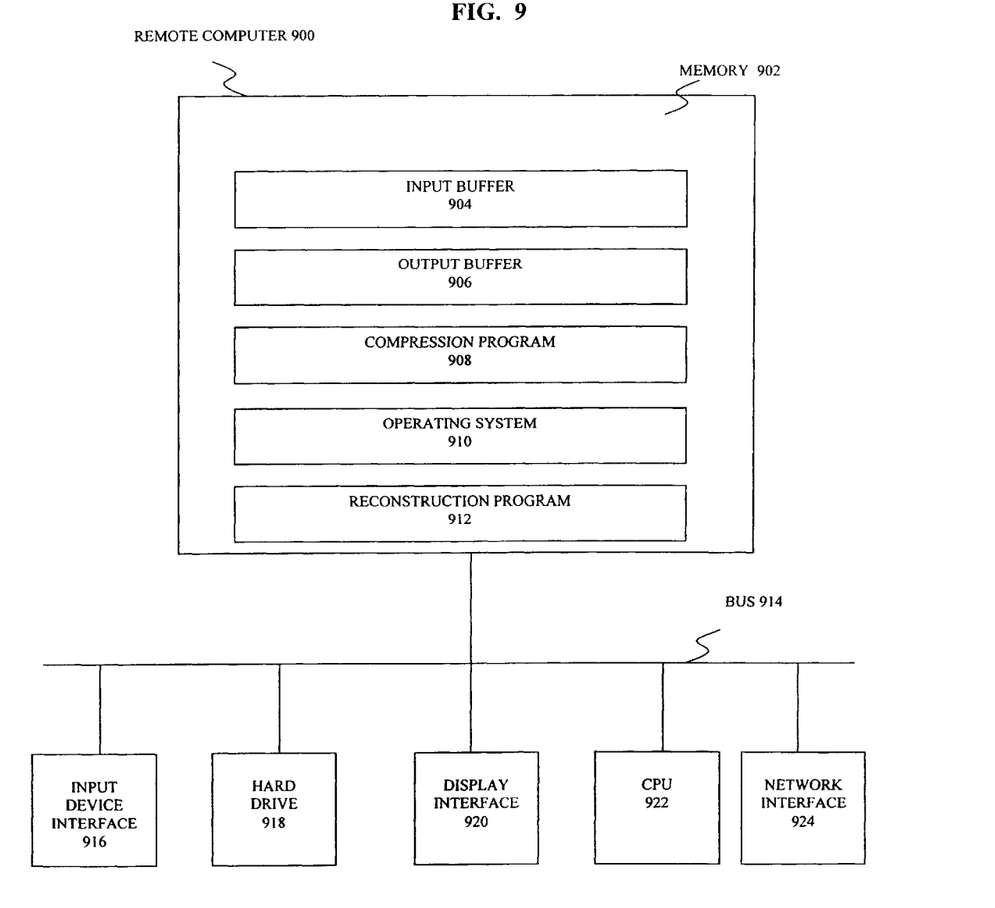
FIG. 9 is a functional block diagram of a remote computer in which the invention of the present invention can be carried out.

In Step 360, the reduced bit stream corresponding to the image is stored as a file. In one embodiment the file can be stored in memory of computer 100. In an alternative embodiment, the file can be transmitted to remote computer 900 at remote location using network interface 112 and stored in memory 902. A user may access the file from memory at a future time for transmission and decompression. The resultant file has dramatic size and image quality improvements over conventional methods. In addition, compression-specific non-pixel information generated by the conversion routine 116a is stored and or transmitted in association with the reduced bit stream representing the quantized approximation values to enable the reconstruction of the color image.

The non-pixel data includes the mean vector, the eigenmatrix and scale factors for the image. The non-pixel information is used to restore the color image to near original form during reconstruction. In the preferred embodiment, compression-specific non-pixel information is provided inside JPEG application-specific markers or tags and stored in the file as ASCII data. In an alternative embodiment, the bit stream may be transmitted to a computer 900 at a remote location using a network interface 112 and stored in memory 902. One having ordinary skill in the art would recognize and appreciate such transmission modalities include but are not limited to modems and wireless devices. The compression-specific non-pixel information is transmitted with the bit stream using markers or tags, and ultimately used by the remote system to reconstruct the compressed image.

Figure 4:
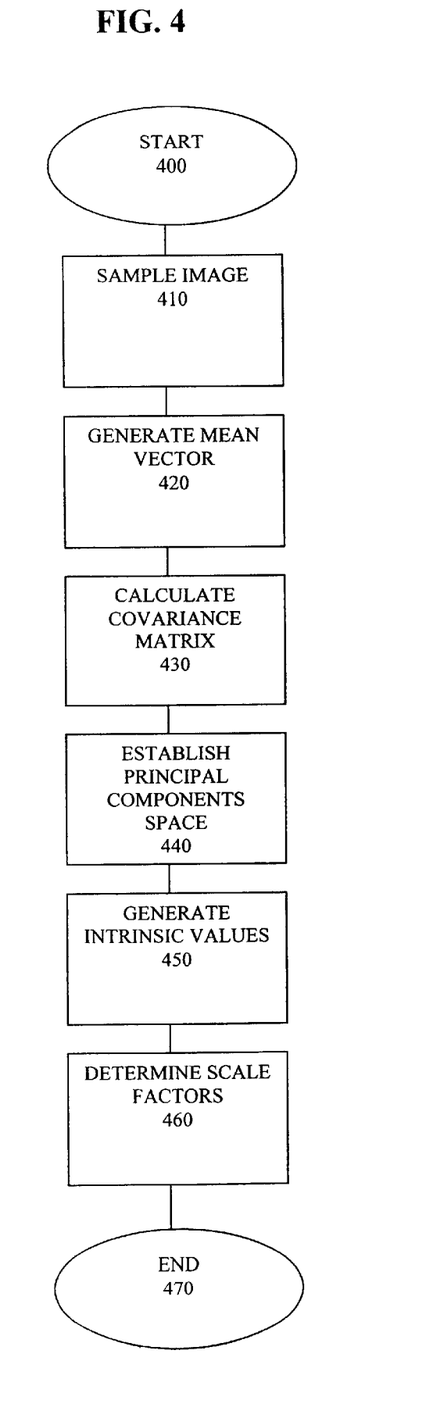
FIG. 4 is a flow diagram of the conversion function implemented by the method of the present invention.

In FIG. 4, the conversion function 116a of the present invention, discussed generally above in FIG. 3, is now fully set forth in a block diagram. The conversion function implements a Karhunen-Loeve (KL) color transformation to generate intrinsic color information that is specific and unique to an individual color image. The KL transform uses a color image's color statistics and color distribution to compute and establish a principal components space having a coordinate system particular to the image. The axes of the principal components space are defined by the color distribution of the image, and thus vary from image to image.

In Step 400, the KL transform begins. In Step 410, input color information, obtained in Step 310, is received to generate the mean vector for the color image. The mean vector consists of three floating-point numbers and is represented by the formula $m=(m_R \: m_G \: m_B)^T$. Each floating-point number of the mean vector corresponds to the average value of the respective color component, as designated by the subscript, of sampled pixels. For example, the floating-point number $m_R$ will be the average of the red color component values for the sampled pixels. In the preferred embodiment, the process samples every eighth pixel across in a row and down in a column starting from the upper left corner pixel to obtain a sufficient statistical sampling, customarily considered to be greater than two thousand pixels. One having ordinary skill in the art will recognize that the sampling frequency and sampling set size can be modified without departing from the scope and spirit of the invention claimed herein.

Figure 5:
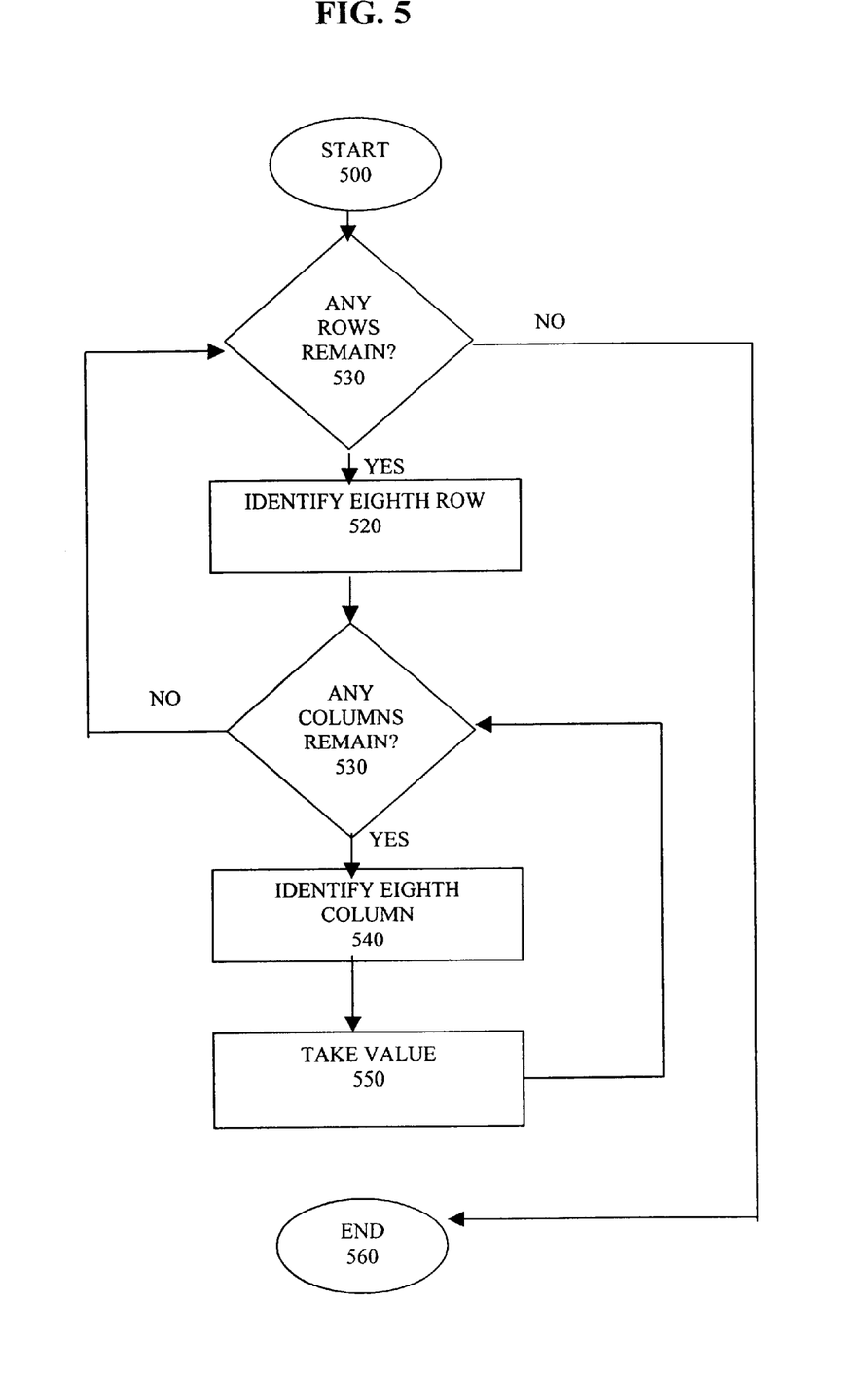
FIG. 5 is a flow diagram of the sampling algorithm performed for generating the mean vector of a color image.

Referring briefly to FIG. 5, the sampling algorithm performed in Step 410 is provided in a flowchart. In Step 500, the process starts by locating the pixel in the upper left corner of the color image. In Step 510, the process determines whether there are any remaining rows of pixels in the image to be sampled. If there are rows in the image to be sampled, the process proceeds to Step 520 where the sampling process identifies an eighth row of pixels in the image. If there are no rows to be sampled in image, the process jumps to Step 560. In Step 530, the process determines whether there are any remaining columns in the row of pixels to be sampled. If there are columns in the row of pixels to be sampled, the process proceeds to Step 540 where the sampling process identifies an eighth column in the row. If there are no columns to be sampled in the row, the process returns to Step 510. In Step 550, each value in the numerical value set for the pixel having the position corresponding to the identified row and column is taken and stored for subsequent statistical processing. In Step 560, the sampling process terminates.

Returning again to FIG. 4, in Step 420 all the numerical values taken for a respective color component from sampled pixels are added together to calculate a total component value for the respective color component. For example, all the red color component values from the sample pixels are added to produce a red component total value. The green and blue components total values are generated in a like manner. Once calculated, each of the color component totals are divided by the number of pixels sampled producing the mean vector of the image. The generated mean vector is stored for later use as non-pixel data.

Figure 6:
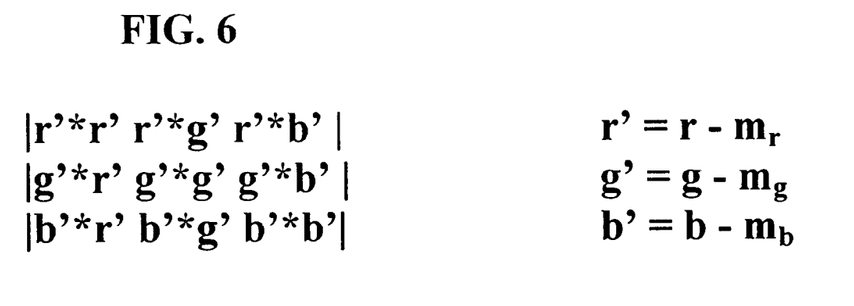
FIG. 6 is an illustration of the covariance matrix generated by the conversion function.

In Step 430, the covariance matrix is computed using the mean vector generated in Step 410. The covariance matrix is a 3×3 floating point matrix. The matrix is computed as defined by the formula $C=E[(p-m)(p-m)^T]$, where p represents the numerical value set of a pixel in the color image, m represents the mean vector, and E represents the expected value of the original image. The covariance matrix is generated for the sampled points by subtracting each floating-point number of the mean vector from its corresponding color component value in the numerical value set of a sampled pixel. The 3×3 covariance matrix C is illustrated in FIG. 6 with equations shown for obtaining each entry from the native (r,g,b) pixel triples.

Returning again to FIG. 4, in Step 440 the statistical color distribution of the obtained and designated color image is used to establish a principal components space. The principal components space is a coordinate system that uses the mean vector as the center of the system. As the center of the principal components space, the mean vector reduces the elimination of color information that has a high concentration in the image. The color image's statistical color distribution is considered when the eigenvalues of the covariance matrix C, and the respective eigenvectors are generated using the formula $Ct_k = \lambda_k t_k$, where t represents an eigenvector, λ represents an eigenvalue, and C represents the covariance matrix generated in Step 430. The subscript k ranges from 1 to 3. This can be accomplished using known programming packages for solving eigensystems (e.g., LINPACK, EISPACK).

The first eigenvector generated represents the first coordinate axis in principal components space. This first eigenvector passes through the center of the principal components space in a direction that explains the most color variation from the mean vector. In addition, the first value in a value set of the intrinsic color information corresponds to a coordinate on the first coordinate axis. The second eigenvector generated represents the second coordinate axis in principal components space. The second eigenvector is orthogonal to the first eigenvector and explains as much of the remaining color variance as possible. The second value in a value set of the intrinsic color information corresponds to a coordinate on the second coordinate axis. The third eigenvector generated represents the third coordinate axis in principal components space. The third principal component is orthogonal to the first and second eigenvectors and explains the remaining color variation. The third value in a value set of the intrinsic color information corresponds to a coordinate on the third coordinate axis. The first, second and third eigenvectors are arranged into an eigenmatrix T. The matrix T is specific to the image since the eigen vectors are defined by the image's color statistics, and thus varies from image to image. Moreover, the matrix has the property that the transpose of the matrix T is its own inverse. Accordingly, the eigenmatrix T is used to convert a color image represented, for example, in RGB color space to principal components color space. In a like manner, the transpose of the eigenmatrix T is used to convert a color image represented in principal components color space to RGB color space. The generated eigen matrix T is stored for later use as non-pixel data.

In Step 450, the sets of numerical values which characterize the image in a normal color space are converted into intrinsic color value sets that characterize the color image in principal components space. The conversion uses the mean vector generated in Step 420 and the eigen matrix generated in Step 440 to generate intrinsic color values that characterize the color image in principal components space. The formula for performing the conversion is defined by $p^c = T(p-m)$, where T is the eigen matrix, m is the mean vector and p is the numerical value set of a pixel in the image. The intrinsic color value sets in principal components space are generated by subtracting the mean vector values from corresponding color component values in a numerical value set and multiplying the results of the subtractions by the eigen matrix T. The intrinsic value sets are a plurality of three floating point values that correspond to the first, second and third principal component space coordinates. This conversion is performed for each numerical value set of a color image to produce a corresponding number of intrinsic color value sets.

In Step 460, scale factors are generated to enable the principal components space coordinates to be mapped into integer byte values. The scale factors include scale and offset values, in the form of floating point numbers, for each axis in principal components space. To compute the scale and offset values, the minimum and maximum principal components space coordinates for each principal components space axis must be identified. Upon identifying the minimum and maximum principal space coordinates, scale and offset values are determined to map principal components space coordinates from the range [min . . . max] into the range [0 . . . 255], where [0 . . . 255] is the range of values an unsigned byte quantity can assume. The offset values correspond to the minimum coordinate values associated with each principal coordinate axis. Accordingly, the minimum coordinate value on each axis is selected as the offset for the axis. The scale values correspond to the maximum coordinate values subtracted from the minimum coordinate values for each principal coordinate axis divided by 255. The scale and offset values are stored for later use as non-pixel data. In Step 470, the process terminates. Upon completion, the plurality of intrinsic value sets of the intrinsic color information is provided to the transformation function 116*b* described above for approximation and quantization using discrete cosine transformation (DCT).

Figure 7:
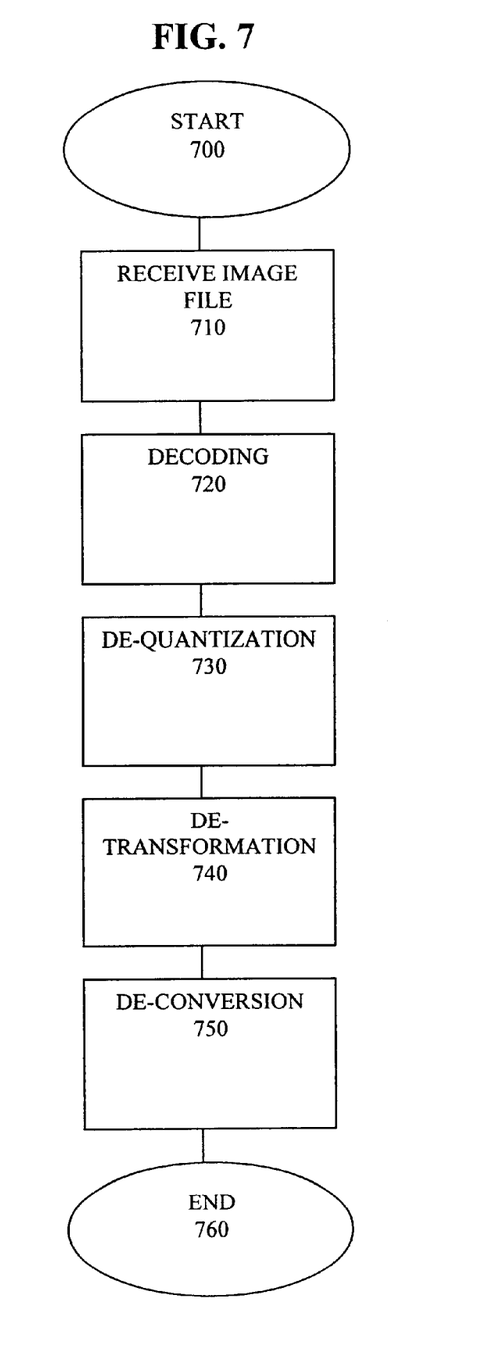
FIG. 7 is a block diagram of the process for reconstructing a color image, depicted as a block diagram.

In FIG. 7, the process for reconstructing a color image is depicted as a block diagram. The reconstruction can be performed on any computer system 100 or 900 having the reconstruction program stored therein. In Step 700, the reconstruction process begins. In Step 710, the process receives a file including information corresponding to an image compressed using the technique described in FIG. 3 through FIG. 6. Accordingly, the information provided in the file is reduced image information and non-pixel data. In Step 720, the CPU 104, under the instruction of decoder function 118*d*, performs an inverse encoding process. The inverse encoding process replaces the reduced image information, which is a stream of bits that compactly represents the image in a non-redundant manner, with a bit stream that originally represented the color image. More specifically, the bit stream that originally represented the quantized approximation values is generated. The techniques and methods for decoding information are well known in the art.

In Step 730, the CPU 104, under the instruction of dequantization function 118*c*, performs an inverse quantization process in response to receiving the bit stream that originally represented the quantized approximation values. The dequantization process returns the plurality of quantized approximation values to there near original range of approximation values. As in the quantization Step 340 above, the process is achieved using a quantization table.

In Step 740, the CPU 104, under the instruction of the transformation function 118*b*, performs an inverse approximation of the original approximation values. The process generates a plurality of value sets that are substantially similar to the original plurality of intrinsic value sets. The transformation function 118*b* applies the inverse of the JPEG discrete cosine transform (DCT) to generate the plurality of value sets that are substantially similar to the original plurality of intrinsic value sets. The techniques and methods for implementing the inverse JPEG discrete cosine transform (DCT) are well known in the art.

In Step 750, the substantially similar plurality of intrinsic value sets are converted back to numerical value sets that characterize the color image in normal color space. The conversion of the intrinsic value sets to numerical value sets is accomplished using the non-pixel data. The process converts the values of the intrinsic value sets from floating point numbers to unsigned byte numbers.

In Step 760 the process ends. Information corresponding to the numerical values sets are transmitted to the output buffer 124 for display on display interface 102.

Figure 8:
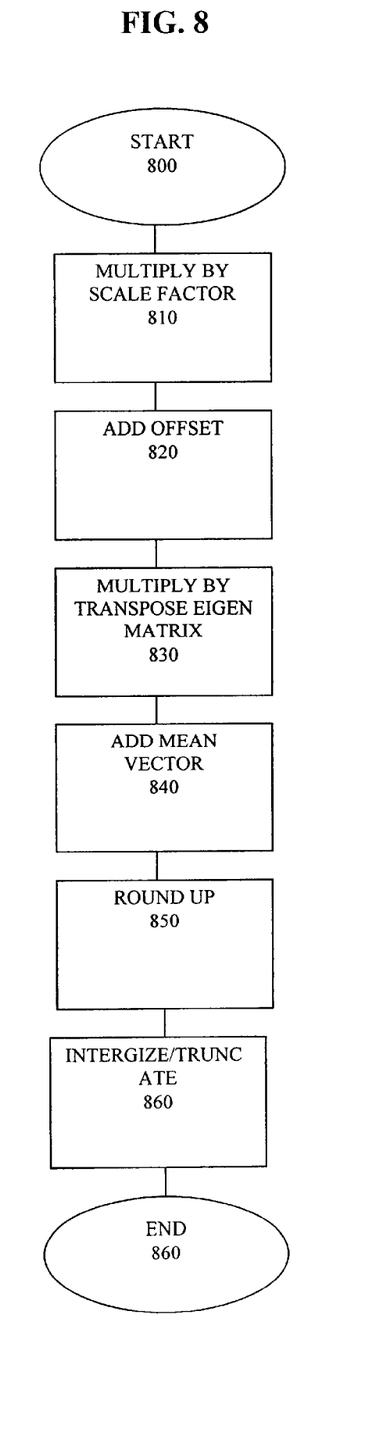
FIG. 8 is a flow diagram for the method of converting the plurality of intrinsic value sets to numerical value sets.

Referring briefly to FIG. 8 where the method of converting the plurality of intrinsic value sets to numerical value sets is depicted. In Step 800 the process begins. In Step 810, each principal coordinate value in an intrinsic value set is multiplied by its corresponding scale factor. This step is repeated for each intrinsic value set that is in the plurality of intrinsic value sets. In Step 820, each principal coordinate value in an intrinsic value set is added to its corresponding offset. Like Step 810, this step is repeated for each intrinsic value set that is in the plurality of intrinsic value sets. In Step 830, each intrinsic value set in the plurality of intrinsic value sets is multiplied by the transpose of the eigenmatrix T. In Step 840, the mean vector is added to each intrinsic value in the plurality of intrinsic value sets. In Step 850, a value of 0.5 is added to each intrinsic value in the plurality of intrinsic value sets. In Step 860, each intrinsic value in the plurality of intrinsic value sets is truncated to a whole value. In addition, intrinsic values that are less than zero are made equal to zero and intrinsic values that are greater than 255 are made equal to 255. The process terminates in Step 870.

Although specific embodiments of the present invention have been described, it will be understood by those skilled in the art that there are other embodiments that are equivalent to the described embodiments. Accordingly it is to be understood that the invention is not to be limited by the specific illustrated embodiments, but only be the scope of the appended claims.

What is claimed is:

1. A method for compressing a true color image comprising the steps of:
   a) receiving color image information for the color image;
   b) converting the received color image information to intrinsic color information;
   c) transforming the intrinsic color information;
   d) quantizing the transformed information;
   e) encoding the quantized information; and
   f) storing the encoded information.

2. The method of claim 1, wherein the color image is a first image type of a plurality of image types.

3. The method of claim 1, wherein the color image information corresponds to a first color space of a plurality of color spaces.

4. The method of claim 1, wherein the intrinsic color information uniquely characterizes the color image.

5. The method of claim 1, wherein the intrinsic color information represents the color image in a principal components space.

6. The method of claim 5, wherein the principal components space is defined by the color image's color distribution.

7. The method of claim 1, further comprising the step of:
a) generating non-pixel data associated with the color image; and
b) storing the non-pixel data in association with the encoded information.

8. The method of claim 1, wherein the non-pixel data and the encoded information are stored in a file.

9. A system for compressing a true color image comprising:
a) a means for receiving color image information for the color image;
b) a means for converting the received color image information to intrinsic color information;
c) a means for transforming the intrinsic color information;
d) a means for quantizing the transformed information;
e) a means for encoding the quantized information; and
f) a means for storing the encoded information.

10. The system of claim 9, wherein the color image is a first image type of a plurality of image types.

11. The system of claim 9, wherein the color image information corresponds to a first color space of a plurality of color spaces.

12. The system of claim 9, wherein the intrinsic color information uniquely characterizes the color image.

13. The system of claim 9, wherein the intrinsic color information represents the color image in a principal components space.

14. The system of claim 13, wherein the principal components space is defined by the color image's color distribution.

15. The system of claim 9, further comprising:
a) a means for generating non-pixel data associated with the color image; and
b) a means for storing the non-pixel data in the file.

16. The system of claim 9, wherein the non-pixel data and the encoded information are stored in a file.

17. A computer-readable medium having executable instructions for performing compression of a color image, which when executed by a processor cause the processor to:
a) receive color image information for the color image;
b) convert the received color image information to intrinsic color information;
c) transform the intrinsic color information;
d) quantize the transformed information;
e) encode the quantized information; and
f) store the encoded information.

18. The computer-readable medium of claim 17, wherein the color image is a first image type of a plurality of image types.

19. The computer-readable medium of claim 17, wherein the color image information corresponds to a first color space of a plurality of color spaces.

20. The computer-readable medium of claim 17, wherein the intrinsic color information uniquely characterizes the color image.

21. The computer-readable medium of claim 17, wherein the intrinsic color information represents the color image in a principal components space.

22. The computer-readable medium of claim 21, wherein the principal components space is defined by the color image's color distribution.

23. The computer-readable medium of claim 17, further comprising the step of:
a) generate non-pixel data associated with the color image; and
b) store the non-pixel data in association with the encoded information.

24. The computer-readable medium of claim 17, wherein the non-pixel data and the encoded information are stored in a file.

25. A method of color image compression and reconstruction, the method comprising the steps of:
a) receiving color image information for the color image;
b) converting the received color image information to intrinsic color information;
c) transforming the intrinsic color information;
d) quantizing the transformed information;
e) encoding the quantized information; and
f) reconstructing the encoded quantized information using non-pixel data.

26. The method of claim 25, wherein the intrinsic color information uniquely characterizes the color image.

27. The method of claim 25, wherein the intrinsic color information represents the color image in a principal components space.

28. A method for processing an image, the method comprising:
receiving image information associated with an image;
processing the received image information;
determining an intrinsic image space based on at least the received image information, the intrinsic image space associated with an image coordinate system;
converting the received image information into the intrinsic image space;
transforming the converted image information.

29. The method of claim 28 wherein the determining an intrinsic image space based on at least the received image information comprises:
determining an origin of the image coordinate system based on at least the received image information.

30. The method of claim 29 wherein the determining an origin of the image coordinate system comprises:
determining a mean vector based on at least the received image information;
determining the origin of the image coordinate system based on at least information associated with the mean vector.

31. The method of claim 30 wherein the determining a mean vector comprises:
determining a first average value for a red color based on at least the received image information;
determining a second average value for a green color based on at least the received image information;
determining a third average value for a blue color based on at least the received image information.

32. The method of claim 31, wherein the determining a first average value comprises:
selecting a first plurality of pixels associated with the received image information, the first plurality of pixels corresponding to a first plurality of values for the red color respectively;
processing information associated with the first plurality of values;
determining the first average value based on at least information associated with the first plurality of values.

33. The method of claim 28 wherein the determining an intrinsic image space based on at least the received image information comprises:

determining a first direction of a first axis of the image coordinate system based on at least the received image information.

34. The method of claim 33 wherein the determining a first direction of a first axis of the image coordinate system comprises:
   determining a mean vector based on at least the received image information;
   processing information associated with the mean vector and the received image information;
   determining a matrix based on at least information associated with the mean vector and the received image information;
   processing information associated with the matrix;
   determining the first direction of the first axis based on at least information associated with the matrix.

35. The method of claim 34 wherein the determining the first direction of the first axis based on at least information associated with the matrix comprises:
   calculating a first eigenvector based on at least information associated with the matrix.

36. A method for processing an image, the method comprising:
   receiving image information associated with an image;
   processing the received image information;
   determining an intrinsic image space based on at least the received image information, the intrinsic image space associated with an image coordinate system;
   converting the received image information into the intrinsic image space;
   transforming the converted image information;
   wherein the determining an intrinsic image space based on at least the received image information includes:
      determining an origin of the image coordinate system based on at least the received image information;
      determining a first direction of a first axis of the image coordinate system based on at least the received image information.

37. The method of claim 36, and further comprising:
   determining a plurality of scale factors based on at least the converted image information;
   wherein the plurality of scale factors includes a plurality of scale values and a plurality of offset values.

38. The method of claim 36, and further comprising:
   quantizing the transformed image information;
   encoding the quantized image information.

39. A method for processing an image, the method comprising:
   receiving transformed intrinsic color information associated with an image;
   processing the received information, the received information including compressed information associated with the image and first information associated with a compression of the image;
   de-transforming the received information;
   determining a first intrinsic image space based on at least the first information, the first intrinsic image space associated with a first image coordinate system;
   converting the compressed information from the first intrinsic image space to a second image space;
   wherein the determining a first intrinsic image space based on at least the first information includes:
      determining an origin of the fist image coordinate system based on at least the first information;
      determining a first direction of a first axis of the first image coordinate system based on at least the first information.

40. The method of claim 39 wherein the processing the received information comprises:
   determining a plurality of scale factors based on at least the first information;
   wherein the plurality of scale factors includes a plurality of scale values and a plurality of offset values.

41. The method of claim 39 wherein the processing the received information comprises:
   decoding the compressed information;
   de-quantizing the decoded information.

42. The method of claim 39 wherein the second image space is an RGB space.

* * * * *

UNITED STATES PATENT AND TRADEMARK OFFICE
CERTIFICATE OF CORRECTION

PATENT NO. : 6,754,383 B1
DATED : June 22, 2004
INVENTOR(S) : Paul M. Payton It is certified that error appears in the above-identified patent and that said Letters Patent is hereby corrected as shown below:

<u>Column 14,</u>
Line 25, "fist" should read -- first --.

Signed and Sealed this

Thirty-first Day of August, 2004

JON W. DUDAS
*Director of the United States Patent and Trademark Office*